US012762955B2

(12) United States Patent
Scherping et al.

(10) Patent No.: US 12,762,955 B2
(45) Date of Patent: Oct. 13, 2026

(54) METHOD AND ELECTRONIC MONITORING SYSTEM FOR IDENTIFYING A DETRIMENTAL TRAFFIC SITUATION

(71) Applicant: Continental Automotive Technologies GmbH, Hannover (DE)

(72) Inventors: Richard Scherping, Liederbach am Taunus (DE); Daniel Sturma, Frankfurt am Main (DE)

(73) Assignee: AUMOVIO Germany GmbH

( * ) Notice: Subject to any disclaimer, the term of this patent is extended or adjusted under 35 U.S.C. 154(b) by 103 days.

(21) Appl. No.: 18/255,431

(22) PCT Filed: Nov. 23, 2021

(86) PCT No.: PCT/DE2021/200197

§ 371 (c)(1),
(2) Date: Jun. 1, 2023

(87) PCT Pub. No.: WO2022/117160

PCT Pub. Date: Jun. 9, 2022

(65) Prior Publication Data

US 2024/0029566 A1 Jan. 25, 2024

(30) Foreign Application Priority Data

Dec. 1, 2020 (DE) ..................... 10 2020 215 155.5

(51) Int. Cl.
*G08G 1/16* (2006.01)

(52) U.S. Cl.
CPC ............. *G08G 1/163* (2013.01); *G08G 1/166* (2013.01)

(58) Field of Classification Search
None
See application file for complete search history.

(56) References Cited

U.S. PATENT DOCUMENTS

2003/0225546 A1 12/2003 Alfano
2004/0024527 A1* 2/2004 Patera ...................... G08G 5/80 342/29

(Continued)

FOREIGN PATENT DOCUMENTS

CN 108267754 A 7/2018
CN 110146909 A 8/2019

(Continued)

OTHER PUBLICATIONS

Wang, Allen et al., "Fast Risk Assessment for Autonomous Vehicles Using Learned Models of Agent Futures," Jun. 3, 2020, ArXiv (Year: 2020).*

(Continued)

*Primary Examiner* — Madison R. Inserra

(57) ABSTRACT

A method and electronic monitoring system for identifying a detrimental traffic situation of a first road user with a second road user by acquiring position information for ascertaining a position of the first road user and uncertainty information for ascertaining a position detection uncertainty of the first road user, acquiring position information for ascertaining a position of the second road user and uncertainty information for ascertaining a position detection uncertainty of the second road user, converting the uncertainty information of the first road user into a first covariance matrix for describing a location-dependent probability of presence of the first road user in connection with the position of the first road user, converting the uncertainty information of the second road user into a second covariance matrix for describing a location-dependent probability of presence of the second road user in connection with the position of the second road user, and using the first covariance matrix and the second covariance matrix to determine the presence of (Continued)

an adverse traffic situation between the first road user and the second road user.

7 Claims, 4 Drawing Sheets

(56) References Cited

U.S. PATENT DOCUMENTS

| | | | | |
|---|---|---|---|---|
| 2005/0086003 | A1 | 4/2005 | Tarabishy | |
| 2005/0225477 | A1 | 10/2005 | Cong | |
| 2007/0032984 | A1 | 2/2007 | Alfano | |
| 2010/0049440 | A1 | 2/2010 | Alfano | |
| 2017/0210379 | A1* | 7/2017 | Obata | B60W 30/18163 |
| 2019/0227145 | A1* | 7/2019 | Pishehvari | G01S 17/08 |
| 2019/0234751 | A1* | 8/2019 | Takhirov | G01C 21/3461 |
| 2020/0079364 | A1* | 3/2020 | Min | B60W 30/18163 |
| 2020/0174481 | A1 | 6/2020 | Van Heukelom | |

FOREIGN PATENT DOCUMENTS

| | | | | |
|---|---|---|---|---|
| CN | 110617815 | A | 12/2019 | |
| DE | 102011010864 | A1 | 12/2011 | |
| DE | 102018128398 | B3 | 12/2019 | |
| WO | WO-2022088761 | A1 * | 5/2022 | G01S 19/33 |

OTHER PUBLICATIONS

Examination Report dated Jun. 25, 2024 from corresponding European patent application No. 21851589.8.

German Office Action dated May 21, 2021 for the counterpart German Patent Application No. 10 2020 215 155.5.

The International Search Report and the Written Opinion of the International Searching Authority mailed on for the counterpart PCT Application No. PCT/DE2021/200197.

English translation of the International Search Report for the counterpart PCT Application No. PCT/DE2021/200197.

German Second Office Action dated Aug. 8, 2022 for the counterpart German Patent Application No. 10 2020 215 155.5.

Office Action dated Aug. 13, 2025 from corresponding German patent application No. 10 2020 515 155.5.

First Search dated Jul. 26, 2025 from corresponding Chinese patent application No. 202180080984.7.

First Notice of Examination Opinion dated Jul. 26, 2025 rom corresponding Chinese patent application No. 202180080984.7.

Decision of Rejection dated Mar. 17, 2026 from corresponding Chinese patent application No. 202180080984.7.

* cited by examiner

METHOD AND ELECTRONIC MONITORING SYSTEM FOR IDENTIFYING A DETRIMENTAL TRAFFIC SITUATION

CROSS-REFERENCE TO RELATED APPLICATIONS

The present application is a National Stage Application under 35 U.S.C. § 371 of International Patent Application No. PCT/DE2021/200197 filed on Nov. 23, 2021, and claims priority from German Patent Application No. 10 2020 215 155.5 filed on Dec. 1, 2020, in the German Patent and Trade Mark Office, the disclosures of which are herein incorporated by reference in their entireties.

BACKGROUND

1. Field

Embodiments of the present application relate to a method for determining an adverse traffic situation and to a corresponding electronic control system.

2. Description of Related Art

The position of a road user may be transmitted, for example, by way of a cooperative awareness message (CAM), in accordance with ETSI EN 302 637-2, and/or a basic safety message (BSM), in accordance with SAE J2735, to other road users, in particular in order to avoid potentially safety-critical traffic situations, such as collisions, or to be able to carry out cooperative driving maneuvers. As a result of the standardization of vehicle-to-X (V2X) messages, such as for example by SAE or ETSI, position accuracy estimates or position detection uncertainty are transmitted by way of V2X messages using the three values major axis, minor axis and orientation of the ellipse, describing the position determination uncertainty, of a predefined probability of presence threshold value. This ellipse contains the reference point of the vehicle, for example on the basis of the standard with a 95 percent or 68 percent probability. Thus, when considering the position detection uncertainty of a road user using systems that are conventional at present, only these three values are available, without in this case knowing the actual position of the road user in question. For example, with regard to calculating probabilities of collision between multiple road users, there are thus considerable disadvantages with systems in this regard.

SUMMARY Aspects of embodiments of the present application may be considered for providing a means by way of which it is possible to determine an adverse traffic situation of one road user with another road user in an improved manner.

According to a first aspect of the disclosure, what is described is a method for determining an adverse traffic situation of a first road user with a second road user, said method having the following steps: acquiring position information for ascertaining a position of the first road user, in particular in a global coordinate system, and uncertainty information for ascertaining a position detection uncertainty of the first road user, acquiring position information for ascertaining a position of the second road user, in particular in the global coordinate system, and uncertainty information for ascertaining a position detection uncertainty of the second road user, converting the uncertainty information of the first road user into a first covariance matrix for describing a location-dependent probability of presence of the first road user in connection with the position of the first road user, converting the uncertainty information of the second road user into a second covariance matrix for describing a location-dependent probability of presence of the second road user in connection with the position of the second road user, and using the first covariance matrix and the second covariance matrix to determine the presence of an adverse traffic situation between the first road user and the second road user.

The underlying concept is that uncertainty information, determined by the first road user, for describing a position detection uncertainty of the first road user is converted into a covariance matrix, in particular using a closed formula. The position detection is used here to determine position information for describing a position of the first road user. In the same way, uncertainty information, received from a second road user, for describing a position detection uncertainty of the second road user is converted into a covariance matrix, in particular using a closed formula. The uncertainty information of the second road user may in this case be determined by the second road user in a manner comparable to that of the first road user. The use of covariance matrices is expedient and advantageous in particular when normally distributed errors are present. The determination as to whether an adverse traffic situation is present between the first road user and the second road user is in this case extremely efficient in terms of resources and may be embodied in a variety of application-specific and situation-specific ways by defining relevant parameters. Storage, transmission and calculation using such matrices leads in particular to a general harmonization and improvement in data quality. Coordinate transformations and the handling even of uncertainty information and/or position information of a plurality of road users, as well as fusion with data from other sources, in particular the vehicle's own surroundings sensors as part of the sensor data fusion, are thereby considerably simplified or even made possible.

An adverse traffic situation is understood in particular to mean a traffic situation that has or may have effects that jeopardize or influence safety, comfort and/or driving efficiency for the first road user and/or the second road user and/or a third party. Effects that impair safety may be for example personal injury and/or property damage. A traffic situation that may or would have effects that impair safety is referred to below as a safety-critical traffic situation, wherein for example a collision or an imminent collision or falling below a certain distance between the first road user and the second road user comes into consideration in this regard. According to one example, the first and the second covariance matrix may thus be used to determine a probability of collision of the first road user and the second road user.

The method is intended in particular to be carried out by an electronic control system or a data processing computing device of the first road user.

The covariance matrices determined on the basis of the uncertainty information describe, in connection with the respective positions of the first or second road user, in particular the probability of presence of the first or second road user for an area in question. This probability of presence may for example be in the form of a multidimensional normal distribution over the area in question, wherein the maximum of the normal distribution describes the highest probability of presence of the first or second road user. Provision may be made in principle to use the position of the respective maximum of the uncertainty information of the first road user and/or the second road user as position information for ascertaining the position of the first or second road user, in particular in relation to a respective reference point of the first or second road user.

A covariance matrix basically represents a mathematical representation of a multidimensional normal distribution, wherein the covariance matrices of the uncertainty information of the first road user and of the uncertainty information of the second road user are expediently represented in the same for example global coordinate system, such as WGS84, by way of the respective positions of the first and second road user. Accordingly, the position information for describing a position of the second road user may be sent or received in a manner for example represented in a global coordinate system, such as WGS 84.

As described, furthermore, position information for ascertaining a position of the first road user is acquired and position information for ascertaining a position of the second road user is also acquired. The position detection by the first road user and/or the second road user is performed in particular using a global satellite navigation system (GNSS), such as for example GPS, Glonass, Galileo, etc., for which the first road user or the second road user expediently in each case comprises a corresponding GNSS receiver for determining its own position. Furthermore, the first road user has computing means for determining the uncertainty information for ascertaining a position detection uncertainty of the first road user and the second road user has computing means for determining the uncertainty information for ascertaining a position detection uncertainty of the second road user.

According to at least one embodiment, the uncertainty information of the first road user and/or of the second road user describes a dimension of a major axis, a dimension of a minor axis and an orientation, in particular in relation to the global coordinate system of an area representing the position detection uncertainty of the first road user or the second road user. As described at the outset, this ellipse, describing the uncertainty in the position determination, of the road user in question contains the reference point of the road user, for example on the basis of the standard with a 95 percent or 68 percent probability. The ellipse is accordingly expediently defined by a center point or the position in a global coordinate system, the dimension of a major axis, the dimension of a minor axis and the orientation.

According to at least one embodiment, the position information and uncertainty information sent by the second road user is received by a vehicle-to-X communication device of the first road user. The second road user may accordingly likewise have a vehicle-to-X communication device and send the position information and the uncertainty information, wherein the position information and the uncertainty information may be received directly or indirectly. Direct in this sense should be understood to mean direct transmission from the communication device of the second road user to the first road user. Indirect should be understood to mean indirect transmission from the communication device of the second road user to the first road user in such a way that, for example, at least one further process of receiving and resending the uncertainty information is carried out by a communication device, for example of another road user, a so-called roadside unit and/or a mobile radio base station, between sending by the second road user and reception by the first road user.

According to at least one embodiment, to determine the presence of an adverse traffic situation between the first road user and the second road user, a location-dependent superimposition of the local probabilities of presence of the first road user and of the second road user, described by the first covariance matrix and the second covariance matrix in connection with the respective positions of the first and second road user, is carried out.

According to at least one embodiment, the result of a matrix operation, comprising the first covariance matrix and the second covariance matrix, is used to determine the presence of an adverse traffic situation between the first road user and the second road user. According to one development, the matrix operation is a linear combination of the first covariance matrix and the second covariance matrix. According to one development, it is an addition or subtraction of the first covariance matrix and the second covariance matrix. Linear combinations or coordinate transformations may be represented in a manner particularly efficient in terms of resources using matrix operations.

According to at least one embodiment, the presence of an adverse traffic situation is determined by applying correlation assumptions for describing a measure of the correlation of the position detection uncertainty of the first road user and the position detection uncertainty of the second road user. The measure of the correlation of the uncertainties describes for example correlated effects, or effects that reduce a correlation, on the position detection of the first and second road user and that are to be expected for a specific situation. A correlated effect may be seen for example in the case of atmospheric influences, which may usually be assumed to be essentially the same for essentially both road users for an area that is relevant as in the present case. Environmental influences may also bring about a greater or smaller correlation in this regard. The correlation assumptions may accordingly be designed to be adaptive.

According to at least one embodiment, a risk area for describing an area impaired for the first road user is determined, wherein an evaluation is performed in particular exclusively within the risk area in order to determine the presence of an adverse traffic situation. In particular, in order to determine an adverse traffic situation, the location-dependent superimposition of probabilities of presence of the first road user and of the second road user within the risk area, described by the first covariance matrix and the second covariance matrix taking into account the respective positions of the first road user and the second road user, is assessed. The location-dependent superimposition is calculated here from the covariance matrices of the first and second road users, in particular using the result of the described matrix operation.

According to at least one development, the risk area corresponds to a surroundings detection device for providing local surroundings information to an assistance and/or automation function of the first road user. The risk area thus describes in particular an evaluation area relevant to the performance of the method and for which the presence of an adverse traffic situation is determined. By way of example, the risk area may have a rectangular shape, wherein the first road user is located within this rectangle and wherein the distance between the first road user and the edges of the rectangle in particular describes a safety distance. The shape and the distances between the edges of the shape may be designed to be adaptive depending on the situation, which may be configured for example depending on the current driving dynamics values of the first road user.

According to at least one embodiment, a scalar probability value is determined using the location-dependent superimposition of the probabilities of presence of the first road user and the second road user within the risk area, described by the first covariance matrix and the second covariance matrix.

According to one development, the scalar probability value is determined by way of univariate conditioning.

According to at least one embodiment, the presence of an adverse traffic situation between the first road user and the second road user is recognized if the probability value is equal to or greater than a predefined threshold value.

According to at least one embodiment, depending on the presence of an adverse traffic situation, a control signal is output to a human-machine interface, an electronic control device of a driver assistance function and/or an automated driving control function. Depending on a determined degree and/or the type of an adverse traffic situation that is present, different measures may be taken in this case to eliminate the adverse traffic situation.

According to a further aspect of the disclosure, what is described is an electronic control system for a first road user for determining an adverse traffic situation of the first road user with a second road user, comprising a data processing computing device, wherein the computing device is configured to acquire position information for ascertaining a position of the first road user and uncertainty information for ascertaining a position detection uncertainty of the first road user and to acquire position information for ascertaining a position of the second road user and uncertainty information for ascertaining a position detection uncertainty of a second road user, and to convert the uncertainty information of the first road user into a first covariance matrix for describing a location-dependent probability of presence of the first road user in connection with the position of the first road user and to convert the uncertainty information of the second road user into a second covariance matrix for describing a location-dependent probability of presence of the second road user in connection with the position of the second road user and to use the first and the second covariance matrix to determine the presence of an adverse traffic situation between the first road user and the second road user.

According to a further aspect, the electronic control system is configured to perform a method according to at least one of the described embodiments.

According to at least one embodiment, the electronic control system is contained within a vehicle. The vehicle may be a motor vehicle, in particular a passenger motor vehicle, a heavy goods vehicle, a motorcycle, an electric motor vehicle or a hybrid motor vehicle, a watercraft or an aircraft.

A computing device may be any device that is designed to process at least one of said signals. In particular, the computing device may be a processor, for example an ASIC, an FPGA, a digital signal processor, a central processing unit (CPU), a multi-purpose processor (MPP) or the like.

In one development of the specified electronic control system, the system has storage hardware that is designed for data transmission with the computing device. In this case, the specified method is stored in the memory in the form of a computer program, and the computing device is provided for carrying out the method when the computer program is loaded into the computing device from the memory.

According to a further aspect of an embodiment, a computer program comprises program code means in order to perform all the steps of one of the specified methods when the computer program is executed on a computer or one of the specified devices.

According to a further aspect of an embodiment, a computer program product contains a program code that is stored on a computer-readable data carrier and that, when executed on a data processing device, performs one of the specified methods.

BRIEF DESCRIPTION OF THE FIGURES

Some particularly advantageous embodiments are specified in the dependent claims. Further preferred embodiments also emerge from the following description of exemplary embodiments on the basis of figures.

In each case schematically.

DETAILED DESCRIPTION

In order to allow a brief and simple description of the exemplary embodiments, essentially functionally identical elements are provided with the same reference signs.

Figure 1A:
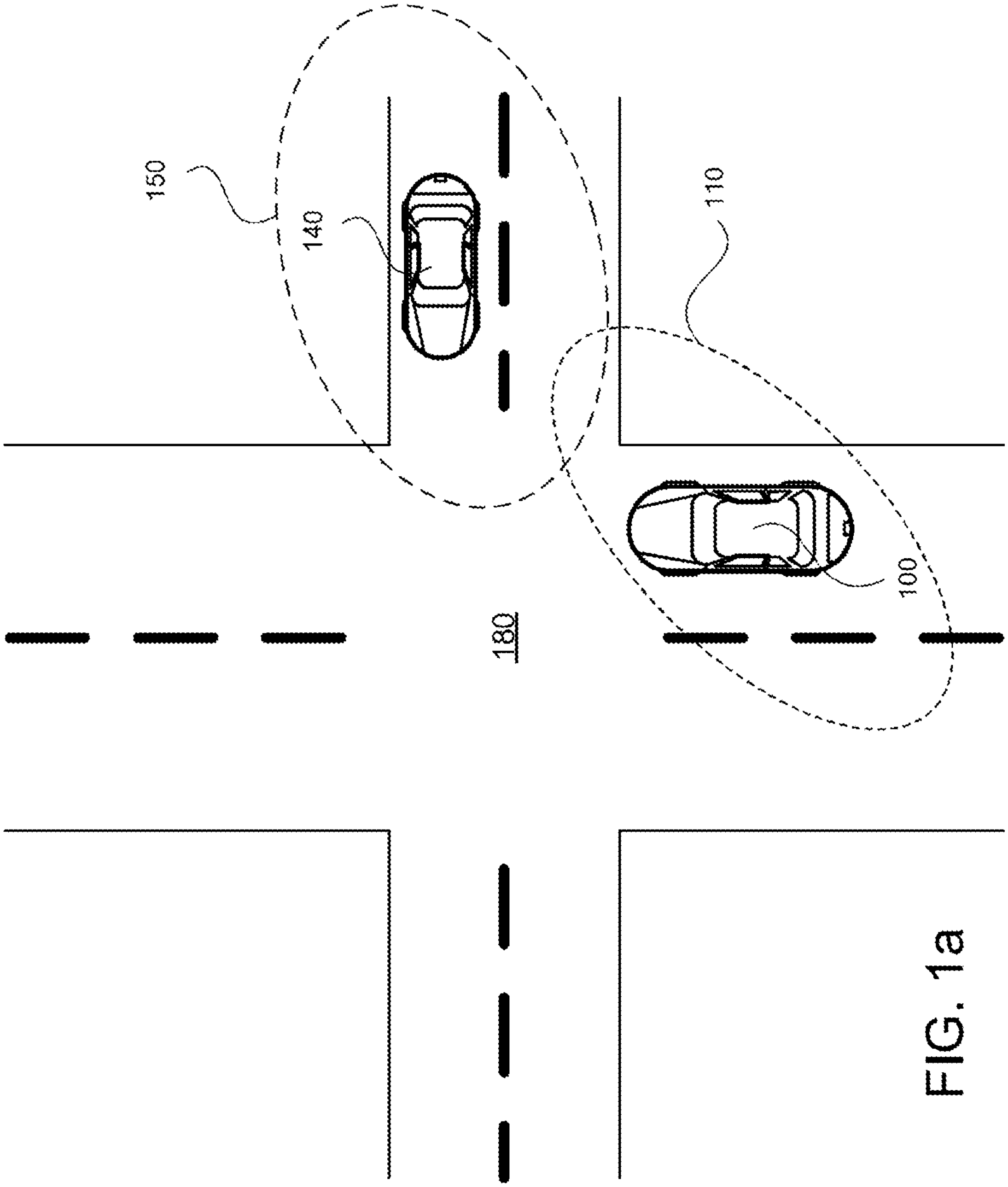
FIGS. 1*a* and 1*b* are diagrams illustrating an exemplary adverse traffic situation at a roadway intersection.
Figure 1B:
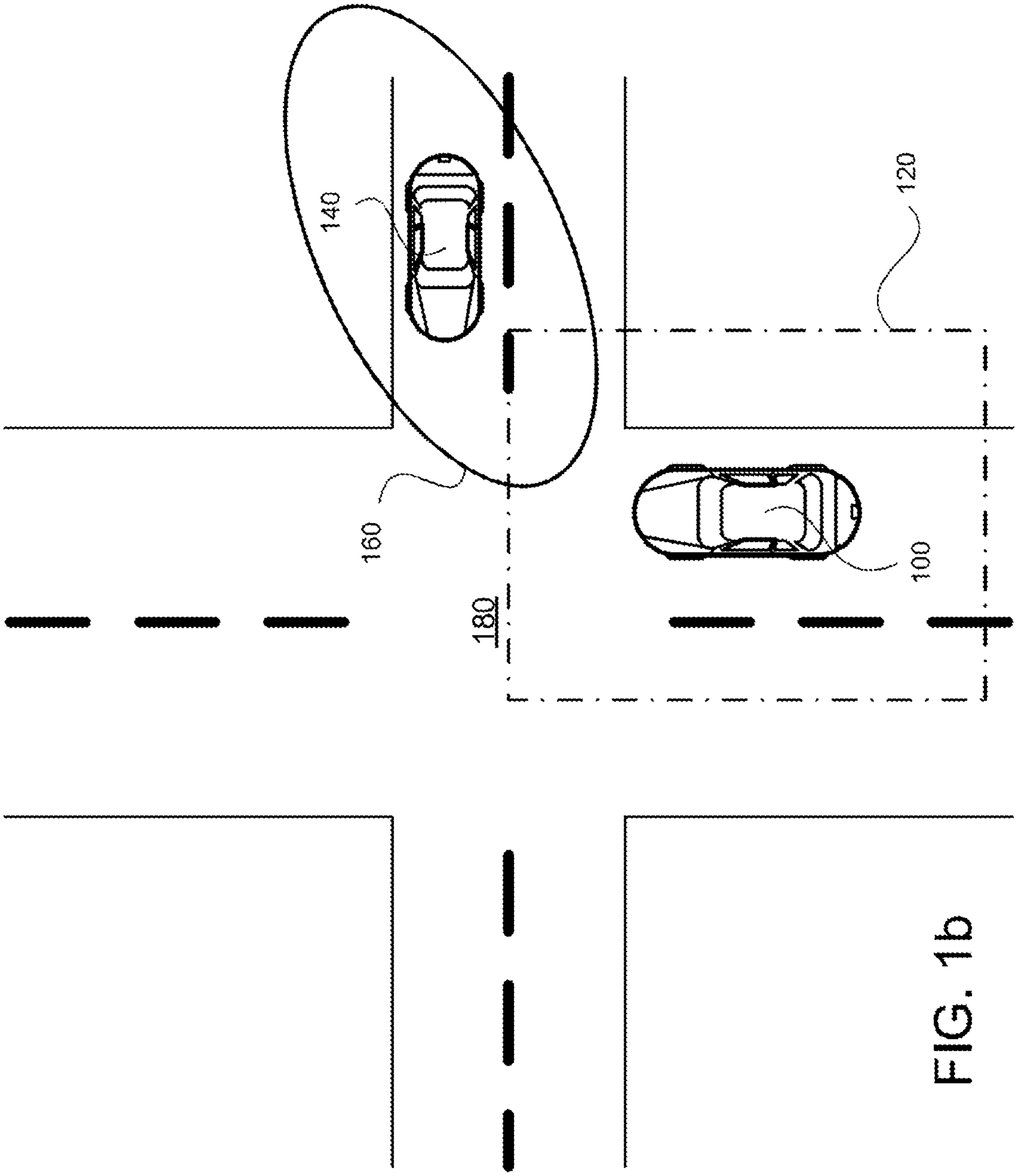

FIGS. 1*a* and 1*b* show an exemplary adverse traffic situation at a roadway intersection 180, wherein a first road user or first vehicle 100, having one embodiment of the electronic control system 300 (not illustrated in FIGS. 1*a/b*), with a vehicle-to-X communication device 310 and a second road user or second vehicle 140 with a vehicle-to-X communication device (not illustrated in FIGS. 1*a/b*) are moving in the direction of the intersection 180.

The uncertainty in the position detection 110 performed by a position detection device 360, in particular by way of a GNSS receiver, of the first road user 100 and the uncertainty in the position detection 150 of the second road user 140 each describe an ellipse 110 and 150 that may be described by position, major axis, minor axis and orientation. This ellipse, describing the uncertainty in the position determination, of the road user in question contains the reference point of the road user, for example on the basis of the standard with a 95 percent or 68 percent probability. In this respect, the ellipses 110 and 150 represent contour lines of a probability of presence distribution of the first road user 100 and the second road user 140.

FIG. 1*b* furthermore illustrates, in an exemplary rectangular shape around the first road user 100, a risk area 120 for describing an area impaired for the first road user and the probability distribution 160 of the relative position of the first road user 100 and the second road user 140 from the assessment of the first road user 100 at a specific time. The probability distribution 160 of the relative position is determined from the linear combination of the covariance matrices for describing the probabilities of presence 110 and 150 in connection with the respective position. For the sake of clarity, the probabilities of presence 110 and 150 are not illustrated again in FIG. 1*b*.

According to at least one embodiment, a step-by-step prediction of the movements of the first road user 100 and the second road user 140 may be made and an evaluation may be carried out with regard to the presence of an adverse traffic situation, for example the probability of collision, in particular either in each prediction step or for the prediction step before the determined distances between the road users increase again or the probability of an adverse traffic situation decreases again. The respective current movement values may be taken as a basis here for the prediction and the movement profiles may be predicted for a predefined duration based thereon. The length of the predefined prediction duration may be made dependent in particular on the current movement values.

The movement dynamics of the road users may basically be taken into account as part of the prediction steps and/or by adapting the size of the risk area 120.

This will be discussed in more detail below in the explanations regarding the method 200 and the electronic control device 300.

Figure 2:
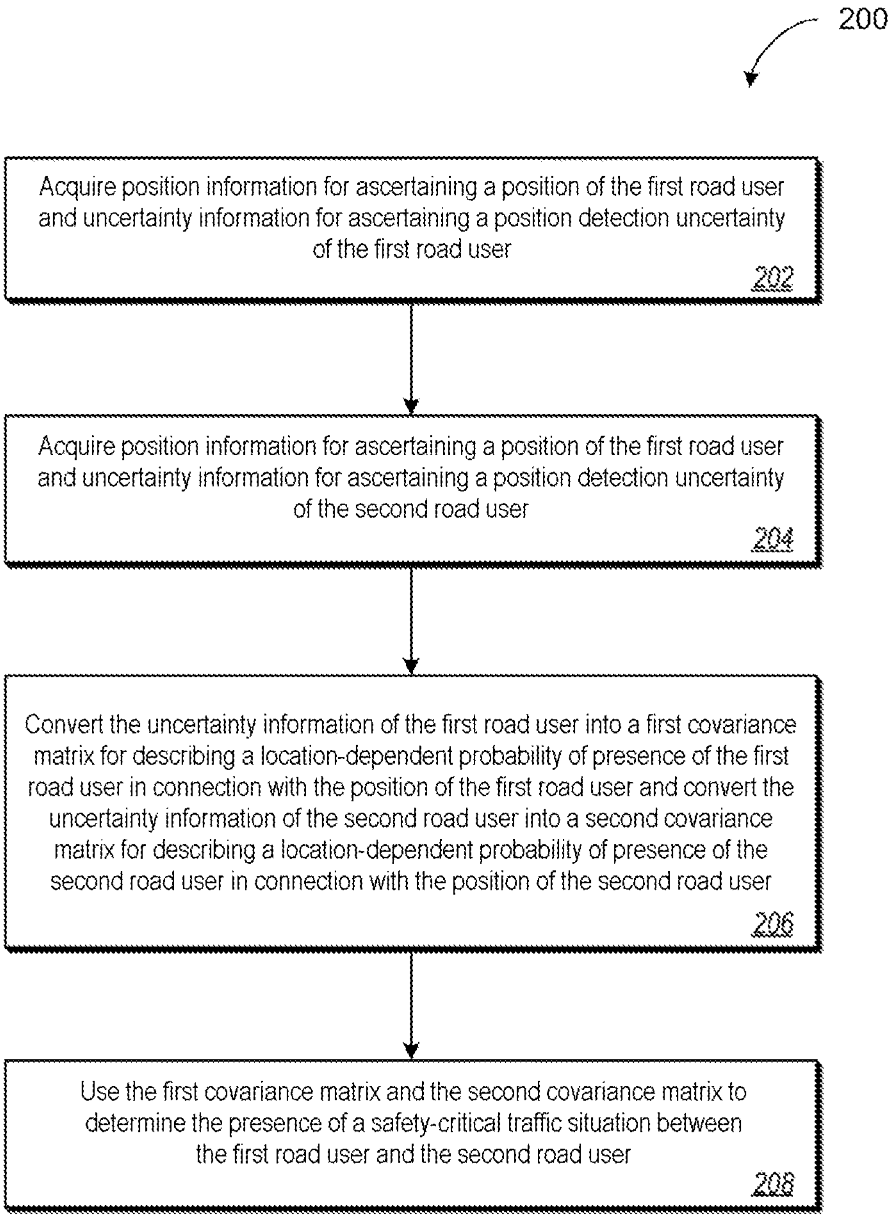
FIG. 2 is a flowchart illustrating a method of determining whether an adverse traffic situation between the first road user and the second road user is present.

FIG. 2 shows one embodiment of the method 200 for determining whether an adverse traffic situation between the first road user and the second road user is present. According to one example, the method is carried out by an electronic control system 300 of the first road user 100. In particular, an adverse traffic situation is present if, taking into account the current driving dynamics values of the first road user 100 and the second road user 140, there would be a collision between the two or the second road user 140 is located within a risk area 120 of the first road user 100 or will move into said risk area.

In a step 202, position information for ascertaining a position of the first road user and uncertainty information for ascertaining a position detection 110 uncertainty of the first road user 100 is acquired.

In a step 204, position information for ascertaining a position of the second road user and uncertainty information for ascertaining a position detection 150 uncertainty of the second road user 140 is acquired. According to one development, the uncertainty information is received by way of a vehicle-to-X communication device 312.

In a step 206, the uncertainty information of the first road user 100 is converted into a first covariance matrix for describing a location-dependent probability of presence of the first road user 100 in connection with the position of the first road user, and the uncertainty information of the second road user 140 is converted into a second covariance matrix for describing a location-dependent probability of presence of the second road user 140 in connection with the position of the second road user.

In a step 208, the first covariance matrix and the second covariance matrix are used to determine the presence of an adverse traffic situation between the first road user 100 and the second road user 140.

According to at least one embodiment, to determine the presence of an adverse traffic situation between the first road user 100 and the second road user 140, a location-dependent superimposition of probabilities of presence of the first road user 100 and of the second road user 140, described by the first covariance matrix and the second covariance matrix in connection with the respective positions, is carried out. This is determined in particular by the result of a matrix operation comprising the first covariance matrix and the second covariance matrix, wherein the matrix operation may be in the form of an addition or subtraction of the first covariance matrix and the second covariance matrix. In this case, according to at least one embodiment, correlation assumptions of the position detection uncertainty of the first road user 100 and the position detection uncertainty of the second road user 140 are taken as a basis.

A risk area 120 for describing an area impaired for the first road user is determined and, to determine the presence of an adverse traffic situation, an assessment is carried out on the location-dependent superimposition of probabilities of presence described by the first covariance matrix and the second covariance matrix in connection with the respective positions of the first road user 100 and the second road user 140 within the risk area 130.

According to at least one embodiment, the risk area 120 corresponds here to a detection area of an assistance and/or automation function of the first road user 100.

Figure 3:
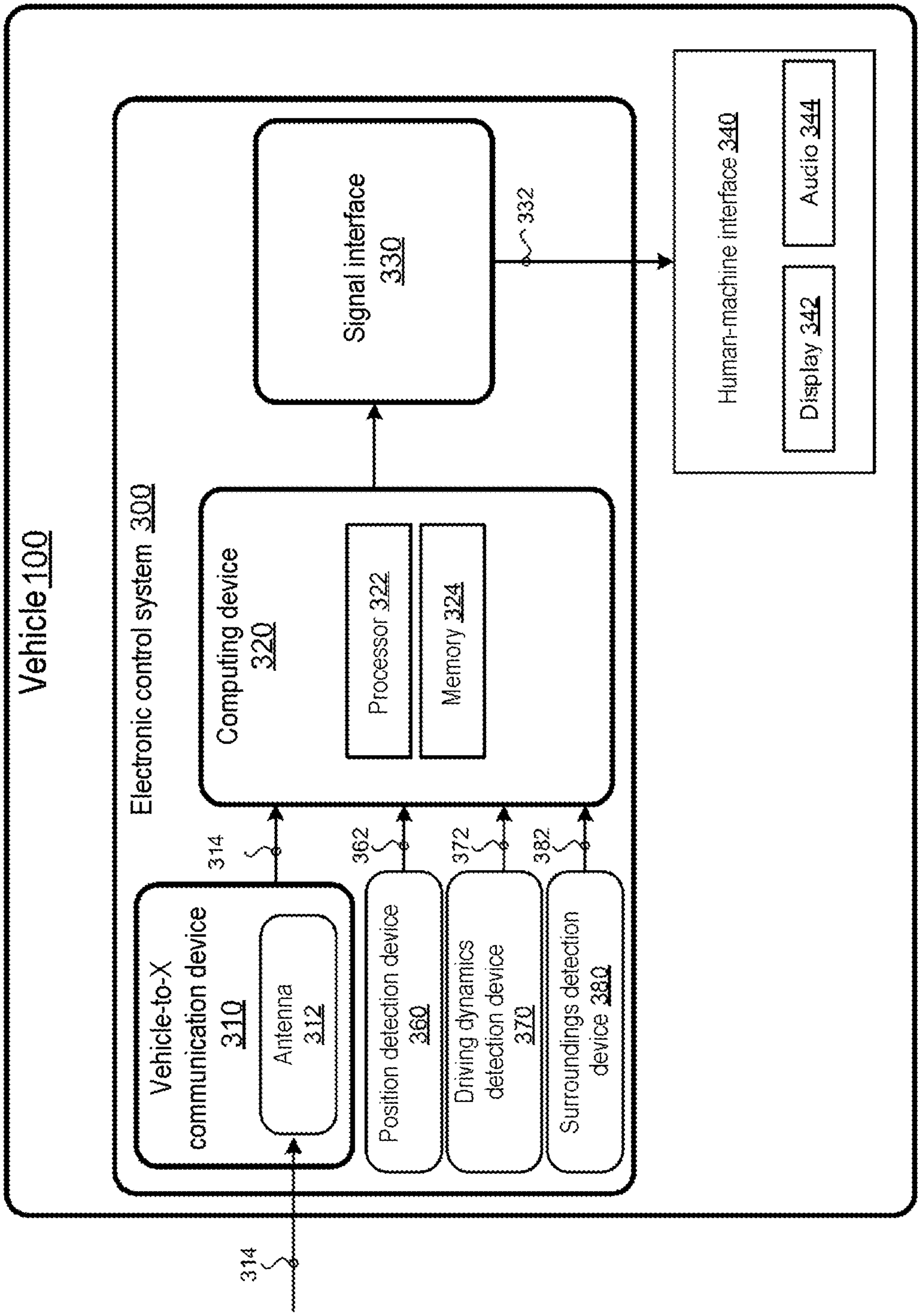
FIG. 3 is a block diagram illustrating an electronic control system according to an embodiment.

FIG. 3 shows one embodiment of an electronic control system 300 of the first road user 100 for determining an adverse traffic situation of the first road user 100 with the second road user 140. The electronic control system 300 comprises a computing device 320 with a data processing processor 322, wherein the computing device 320 is configured to acquire position information for ascertaining a position of the first road user and uncertainty information for ascertaining a position detection 110 uncertainty of the first road user 100 and to acquire position information for ascertaining a position of the second road user and uncertainty information for ascertaining a position detection 150 uncertainty of a second road user 140, and to convert the uncertainty information of the first road user 100 into a first covariance matrix for describing a location-dependent probability of presence of the first road user 100 in connection with the position of the first road user 100 and to convert the uncertainty information of the second road user 140 into a second covariance matrix for describing a location-dependent probability of presence of the second road user 140 in connection with the position of the second road user 140 and to use the first and the second covariance matrix to determine a probability of collision of the first road user 100 and the second road user 140.

In one development of the specified electronic control system 300, the system 300 has a data memory 324 that is designed for data transmission with the computing device 320 or processor 322, wherein the specified method is stored in the form of a computer program in the memory 324 and the processor 322 is intended to execute the method when the computer program is loaded from the memory 324 into the processor 322.

According to at least one embodiment, the electronic control system 300 also has a vehicle-to-X communication device 310 with an antenna 312 for receiving the position information for ascertaining a position of the second road user 140 and uncertainty information 314 for ascertaining a position detection 150 uncertainty of the second road user 140. The uncertainty information may in this case be contained within a vehicle-to-X message. The uncertainty information 314 is provided to the computing device 320.

According to at least one embodiment, the electronic control system 300 has a position detection device 360 for detecting the position of the first road user 100, in particular by way of a GNSS system. On the basis of the position detection, in particular the position information for ascertaining a position of the first road user and uncertainty information for ascertaining an uncertainty in the position detection 110 of the first road user 100 is acquired, in particular by the computing device 320. As an alternative, a further computing device may be used for this purpose, which may be contained as such within the position detection device 360, for example.

According to at least one embodiment, the electronic control system 300 has a driving dynamics detection device 370 for providing driving dynamics information 372, which may be used in particular to support the position detection of the first road user, for example as part of dead reckoning, and using which it is possible to provide an improved information base for determining the presence of an adverse traffic situation with the second road user.

According to at least one embodiment, the electronic control system 300 has a surroundings detection device 380 for providing local surroundings information 382 to the computing device 320. According to at least one embodiment, the risk area 120 corresponds here to a detection area of the surroundings detection device 380. According to at least one embodiment, the determination of the presence of an adverse traffic situation between the first road user 100 and the second road user 140 is limited here to the risk area 120.

According to at least one embodiment, the electronic control system 300 has a signal interface 330 for outputting control signals 332 on the basis of the presence of an adverse traffic situation, for example to a human-machine interface 340 contained within the vehicle 100 and having a display 342 and an audio device 344 for informing a user of the vehicle 100. As an alternative or in addition, the control signals 332 may be output to an electronic control device of a driver assistance function and/or an automated driving control function.

One exemplary embodiment of the method is illustrated below based on underlying calculations.

Position accuracy estimates may be transmitted by the three values major axis MajorAxis, minor axis MinorAxis and orientation φ of the ellipse 150 describing a position determination uncertainty, by way of V2X communication, from the second road user 140 to the first road user 100 and converted, by an electronic control system 300 of the first road user 100, into a covariance matrix CovM2. According to one example, the same procedure is used for the position information 362 acquired by way of the position detection device 360 and uncertainty information of the first road user 100 determined based thereon to obtain a covariance matrix CovM1.

1. Transforming Ellipse into a Covariance Matrix Using a Closed Formula

To calculate the eigenvalues λ1 and λ2:

$$\lambda 1=(\text{MajorAxis}/\text{Chi-Square})^2;$$

$$\lambda 2=(\text{MinorAxis}/\text{Chi-Square})^2;$$

for the respective covariance matrices CovM1 and CovM2, the values of the major axis MajorAxis and minor axis MinorAxis of the ellipse, describing the position determination uncertainty, of the first road user or the second road user are divided by the value Chi-Square. The value Chi-Square is used here as a scaling value with regard to the exemplary 95% confidence interval and may accordingly be 2.4477. The quotient is then squared to obtain the eigenvalues λ1 and λ2.

Since the orientation φ is usually determined in degrees, a conversion to a value θ in radians may be provided, with a multiplication by the quotient of pi π and 180° taking place in a manner known per se.

$$\theta[\text{rad}] = \varphi[\text{degrees}] \cdot \pi/180$$

According to one example, the covariance matrix CovM is a 2×2 matrix, which is determined using the abovementioned values as follows:

$$CovM = \begin{bmatrix} \sigma 11 & \sigma 12 \\ \sigma 21 & \sigma 22 \end{bmatrix}$$

where:

$$\sigma 11 = (\lambda 2 \cdot \tan(\theta)^2 + \lambda 1)/(\tan(\theta)^2 + 1)$$

$$\sigma 12 = (\lambda 1 \cdot \tan(\theta) - \lambda 2 \cdot \tan(\theta))/(\tan(\theta)^2 + 1)$$

$$\sigma 21 = (\lambda 1 \cdot \tan(\theta) - \lambda 2 \cdot \tan(\theta))/(\tan(\theta)^2 + 1)$$

$$\sigma 22 = (\lambda 1 \cdot \tan(\theta)^2 + \lambda 2)/(\tan(\theta)^2 + 1)$$

2. Correlation Assumptions:

The sum Dist_Cov of the covariance matrices of the first road user 100 and the second road user 140 is formed:

$$\text{Dist\_Cov} = \text{Cov}M1 + \text{Cov}M2$$

The presence of an adverse traffic situation is determined, according to at least one embodiment, using correlation assumptions CorrCoeff_XX and CorrCoeff_YY of the position detection uncertainty of the first road user 100 and the position detection uncertainty of the second road user 140. The correlation coefficients according to the example in this case have a value range from 0 to 1, wherein a value equal to 0 corresponds to the assumption of no correlation in the position detection and a value equal to 1 corresponds to an assumption of complete correlation in the position detection of the first road user and the second road user. Such correlations may result for example from an influence on the position detection that is to be expected for an area in question and that has essentially the same effect on both road users. The correlation assumptions or the underlying values may accordingly be designed to be adaptive.

$$\text{Help1\_Matrix} = \begin{bmatrix} \alpha 11 & \alpha 12 \\ \alpha 21 & \alpha 22 \end{bmatrix}$$

where:

$$\alpha 11 = \text{CorrCoeff\_XX} \cdot \sqrt{\text{Cov1}(1, 1)} \cdot \sqrt{\text{Cov2}(1, 1)}$$

$$\alpha 12 = 0$$

$$\alpha 21 = 0$$

$$\alpha 22 = \text{CorrCoeff\_YY} \cdot \sqrt{\text{Cov1}(2, 2)} \cdot \sqrt{\text{Cov2}(2, 2)};$$

CorrCoeff_XX describes a correlation coefficient with respect to an X-axis, for example of a local Cartesian coordinate system of the first road user, in particular with the point 0,0 in the reference point of the first road user, and CorrCoeff_YY describes a correlation coefficient with respect to a Y-axis of this same coordinate system.

Exemplary application of the correlation assumptions to Dist_Cov:

$$\text{Dist\_Cov\_new} = \text{Dist\_Cov} - 2 \cdot \text{Help1\_Matrix};$$

Furthermore, the orientation of Dist_Cov may expediently be retained:

$$\text{Help2\_Matrix} = \begin{bmatrix} \beta 11 & \beta 12 \\ \beta 21 & \beta 22 \end{bmatrix}$$

where:

$$\beta 11 = 1$$

$$\beta 12 = 1/\left(\sqrt{\text{Dist\_Cov}(1,1)} \cdot \sqrt{\text{Dist\_Cov}(2,2)}\right) \cdot \sqrt{\text{Dist\_Cov\_new}(1,1)} \cdot \sqrt{\text{Dist\_Cov\_new}(2,2)}$$

$$\beta 21 = 1/\left(\sqrt{\text{Dist\_Cov}(1,1)} \cdot \sqrt{\text{Dist\_Cov}(2,2)}\right) \cdot \sqrt{\text{Dist\_Cov\_new}(1,1)} \cdot \sqrt{\text{Dist\_Cov\_new}(2,2)}$$

$$\beta 22 = 1$$

and multiplication of the corresponding elements of Dist_Cov_new and Help2_Matrix:

$$\text{Dist\_Cov} = \begin{bmatrix} \Omega 11 \cdot \beta 11 & \Omega 12 \cdot \beta 12 \\ \Omega 21 \cdot \beta 21 & \Omega 22 \cdot \beta 22 \end{bmatrix}$$

3. Approximation of the Probability of Collision

According to at least one embodiment, the scalar probability value P_coll is approximated in particular by way of univariate conditioning, taking into account the limits of the risk area 120 of the first road user 100. The probability of collision describes, in illustrative form here, in particular the proportion of the two-dimensional probability distribution 160, described by the covariance matrix Dist_Cov and the mean vector mu, which is located within the risk area 120.

It is basically a multiplication of the probabilities in the x-direction and in the y-direction of the probability distribution 160 of the relative position of the first road user 100 and the second road user 140. However, multiplication is only involved if the major axes of the probability distribution coincide with the axes of the risk area 120, which is in the shape of a rectangle. According to the exemplary situation according to FIG. 1*b*, the illustrated probability distribution 160 is rotated with respect to the axes of the risk area, which is why univariate conditioning is used.

The underlying concept of the approximation is that of distributing the calculation of the probability value according to $$\text{P\_coll} = P(a1 < X < b1,\ a2 < Y < b2) = P(a1 < X < b1) \cdot P\left(a2 < Y < b2{:}a1 < X < b1\right)$$

A conditional expected value therefore has to be calculated, which may be reproduced below for a brief description using the programming syntax of MATLAB®, wherein the parameters lower and upper indicate the boundaries of the risk area 120 and mu represents the mean of the probability distribution 160 with the covariance matrix Dist_Cov.

The mean of the probability distribution 160 is set to 0 to adjust the integration range:

$$\text{lower}(1) = \text{lower}(1) - mu(1);$$

$$\text{lower}(2) = \text{lower}(2) - mu(2);$$

$$\text{upper}(1) = \text{upper}(1) - mu(1);$$

$$\text{upper}(2) = \text{upper}(2) - mu(2);$$

Using Cholesky decomposition, the covariance matrix Dist_Cov is converted into a lower triangular matrix.

$$C = chol(\text{Dist\_Cov})'$$

The intervals are adjusted for the integral transformation:

$$\text{interval\_adj\_1} = \left[\text{lower}(1)/C(1,1),\ \text{upper}(1)/C(1,1)\right]$$

The first part of the probability value P1 is determined, according to one example, from the difference between the cumulative distribution functions of the standard normal distribution of the determined interval limits:

$$P1 = \text{normcdf}(\text{interval\_}adj\text{\_}1(2)) - \text{normcdf}(\text{interval\_}adj\text{\_}1(1))$$

Transformation:

$$y1 = (normcdf(\text{interval\_adj\_1}(1)) - normcdf(\text{interval\_adj\_1}(2)))/P1;$$

$$g = C(2,1) * y1;$$

$$\text{interval\_adj\_2} = \left[(\text{lower}(2) - g)/C(2,2),\ (\text{upper}(2) - g)/C(2,2)\right];$$

Second Part of the Probability Value P2:

$$P2 = normcdf(\text{interval\_adj\_2}(2)) - normcdf(\text{interval\_adj\_2}(1));$$

Determination of the probability value P_coll: $\text{P\_coll} = P1 * P2;$

If it is found in the course of the proceedings that a feature or a group of features is not absolutely necessary, then the applicant aspires right now to a wording of at least one independent claim that no longer has the feature or the group of features. This may be, for example, a subcombination of a claim present on the filing date or a subcombination of a claim present on the filing date that is restricted by further features. Claims or combinations of features of this kind requiring rewording are intended to be understood as also covered by the disclosure of this application.

It should also be pointed out that refinements, features and variants which are described in the various embodiments or exemplary embodiments and/or shown in the figures may be combined with one another in any desired manner. Single or multiple features are interchangeable with one another in any desired manner. Combinations of features arising therefrom are intended to be understood as also covered by the disclosure of this application.

Back-references in dependent claims are not intended to be understood as a relinquishment of the attainment of independent substantive protection for the features of the back-referenced dependent claims. These features may also be combined with other features in any desired manner.

Features which are only disclosed in the description or features which are only disclosed in the description or in a claim in conjunction with other features may in principle be of independent significance essential to the embodiment. They may therefore also be individually included in claims for the purpose of delimitation from the prior art.

In general, it should be pointed out that vehicle-to-X communication is understood to mean in particular a direct communication between vehicles and/or between vehicles and infrastructure devices. For example, it may thus include vehicle-to-vehicle communication or vehicle-to-infrastructure communication. Where this application refers to a communication between vehicles, said communication may fundamentally take place as part of a vehicle-to-vehicle communication, for example, which may typically take place with or without switching by a mobile radio network or a similar external infrastructure. By way of example, vehicle-to-X communication may take place using the standards IEEE 802.11p, IEEE 1609.4, ETSI ITS-G5, 3GPP LTE-V2X PC5, 5G NR or 5G in general. A vehicle-to-X communication may also be referred to as C2X communication or V2X communication. The sub-domains may be referred to as C2C (car-to-car), V2V (vehicle-to-vehicle) or C2I (car-to-infrastructure), V2I (vehicle-to-infrastructure).

A number of possible implementations have been described. It is nevertheless assumed that various modifications may be made without departing from the spirit and scope of the disclosure. Other implementations accordingly likewise fall within the scope of the following claims.

The invention claimed is:

1. A method for determining an adverse traffic situation of a road user, the method comprising:

acquiring first position information indicating a first position of the road user and first uncertainty information indicating a first position detection uncertainty of the road user;

acquiring second position information for ascertaining a second position of a second road user and second uncertainty information indicating a second position detection uncertainty of the second road user;

converting the first uncertainty information into a first covariance matrix for describing a first location-dependent probability of presence of the road user in connection with a first position of the road user, wherein the uncertainty information of the road user comprises an uncertainty ellipse defined by a major axis, a minor axis, and an orientation, and the converting is performed using a closed-form formula to transform said uncertainty ellipse into the first covariance matrix;

converting the second uncertainty information into a second covariance matrix for describing a second location-dependent probability of presence of the second road user in connection with a second position of the second road user, wherein the uncertainty information of the second road user comprises an uncertainty ellipse defined by a major axis, a minor axis, and an orientation, and said converting is performed using the closed-form formula to transform the uncertainty ellipse into the second covariance matrix; and determining the presence of an adverse traffic situation between the road user and the second road user based on the first covariance matrix and the second covariance matrix;

wherein the determining comprises performing a location-dependent superimposition of the probabilities of presence of the road user as described by the first covariance matrix with the probabilities of the presence of the second road user as described by the second covariance matrix, wherein the determining further comprises summing the first covariance matrix and the second covariance matrix to generate a combined covariance matrix representing a probability distribution of a relative position between the road user and the second road user, applying at least one correlation coefficient to the combined covariance matrix to account for correlation between the first position detection uncertainty and the second position detection uncertainty, and performing the location-dependent superimposition of the probabilities of presence of the road user and the second road user exclusively within a predefined risk area around the road user, the risk area corresponding to a detection area of a surroundings detection device of the road user; and outputting a control signal to an electronic control device of a driver assistance system or an automated driving control system to control an operation of the driver assistance system or the automated driving control system based on presence of the adverse traffic situation.

2. The method as claimed in claim 1, wherein the determining comprises performing a matrix operation of the first covariance matrix and the second covariance matrix.

3. The method as claimed in claim 1, wherein the determining comprises applying correlation assumptions of position detection uncertainty of the road user and position detection uncertainty of the second road user.

4. The method as claimed in claim 1, wherein the determining comprises:

assessing location-dependent superimposition of the probabilities of presence of the road user and the second road user within the risk area, described by the first covariance matrix and the second covariance matrix.

5. The method as claimed in claim 4, further comprising determining a scalar probability value using the location-dependent superimposition of the probabilities of presence of the road user and the second road user within the risk area.

6. The method as claimed in claim 5, further comprising determining the scalar probability value by way of univariate conditioning.

7. The method as claimed in claim 6, wherein the determining comprises determining the presence of the adverse traffic situation between the road user and the second road user if the scalar probability value is equal to or greater than a predefined threshold value.

* * * * *